United States Patent Office 2,927,368
Patented Mar. 8, 1960

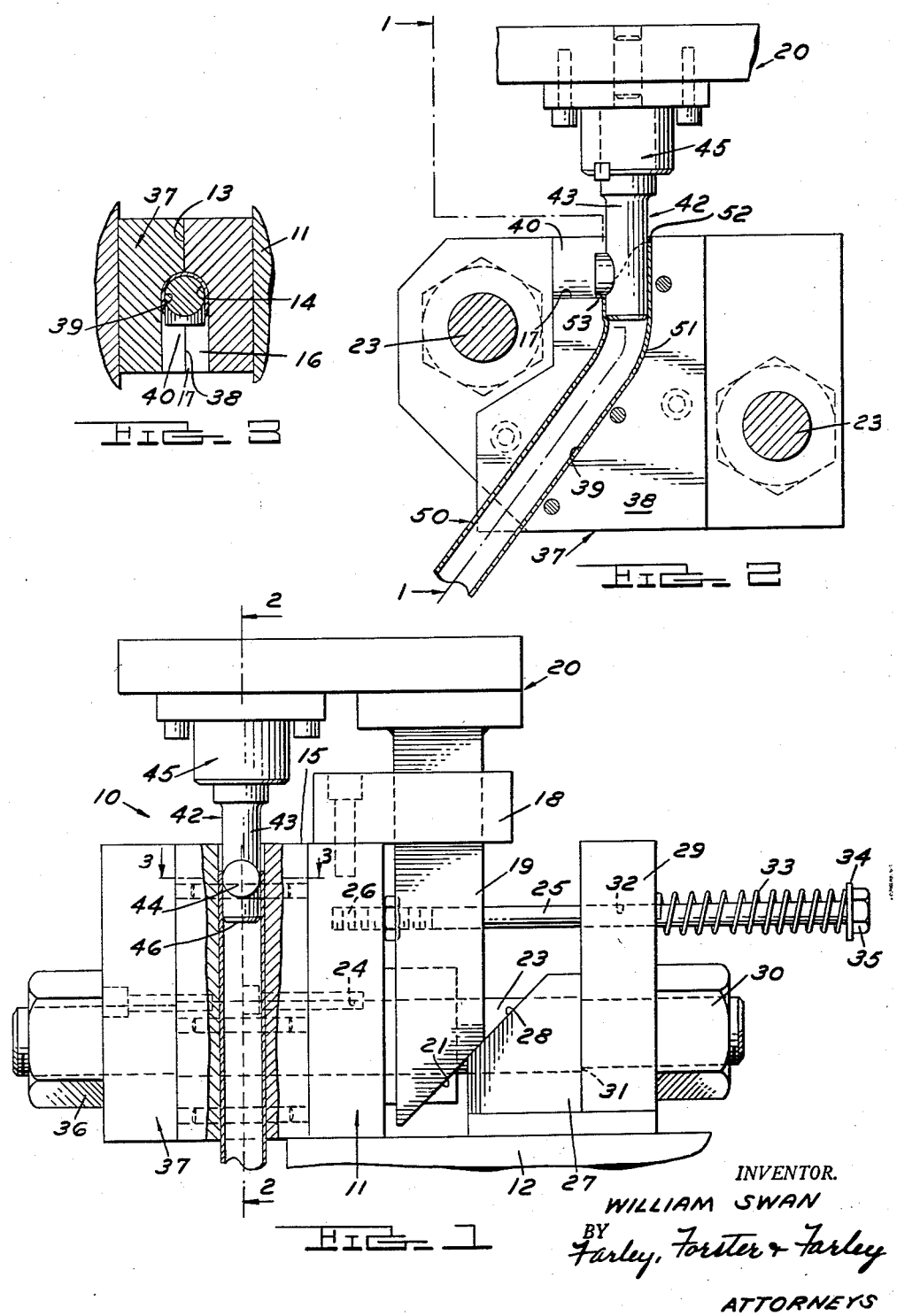

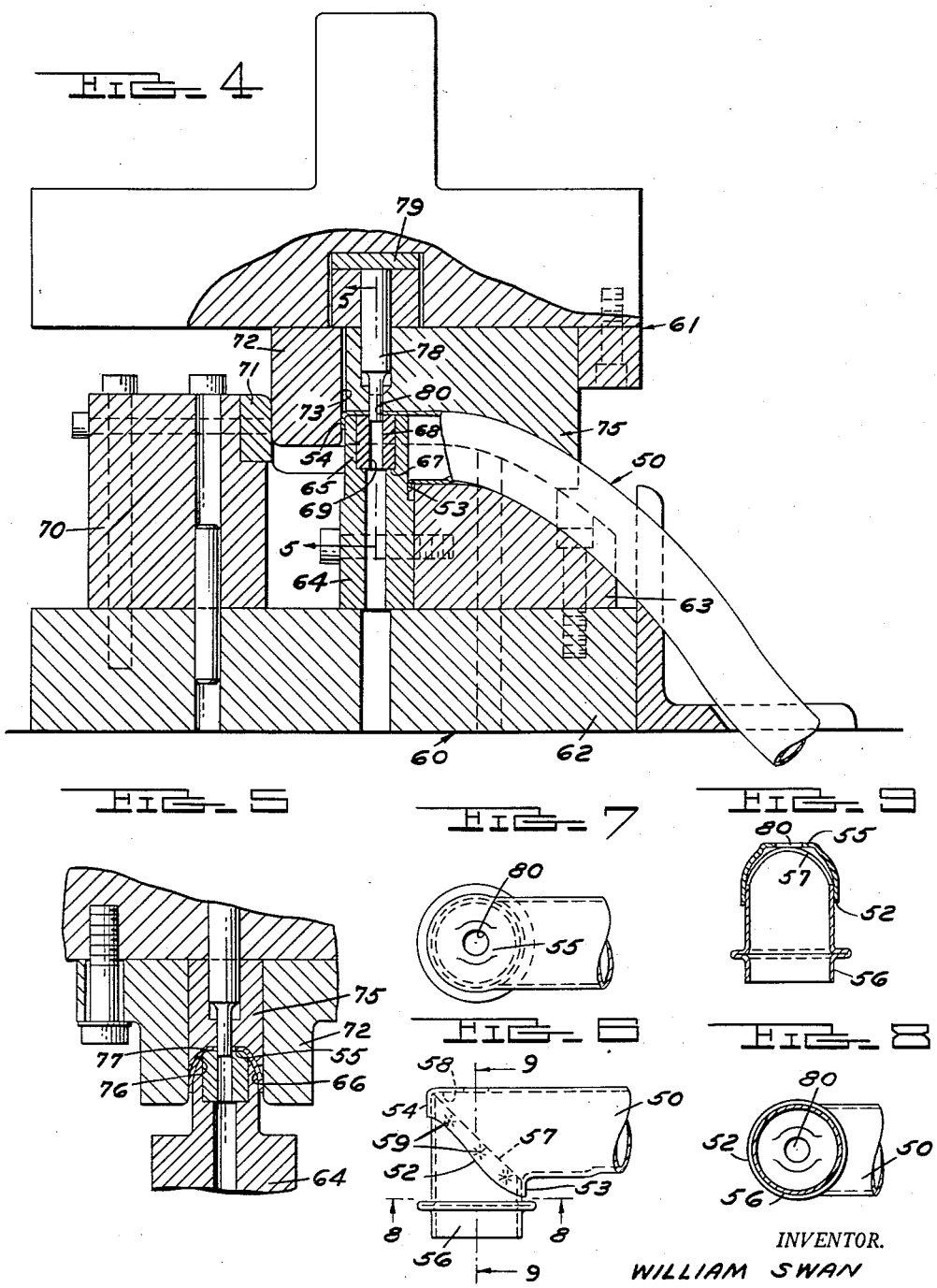

2,927,368

METHOD OF FORMING A TUBULAR ARTICLE HAVING AN ABRUPT CHANGE IN DIRECTION

William Swan, Fowlerville, Mich., assignor to Bent Tube, Inc., Fowlerville, Mich., a corporation of Michigan Application May 14, 1956, Serial No. 584,585

1 Claim. (Cl. 29—157)

The present invention relates to a tubing joint and to a method of making the same. More particularly, this invention pertains to a method for effecting a relatively sharp change in direction in a tubing fabrication assembly composed of two pieces of tubing, and to the tubing assembly, per se.

In the fabrication of tubing assemblies, the problem of effecting abrupt changes in direction has always been vexatious. One of the most common methods of making an abrupt or 90 degree turn in a tubular segment is to sever a tube into two parts along a line of cut at an angle to the longitudinal axis of the tube, which angle is equal to one-half the desired angle of change. For example, in making a 90 degree change in direction, the tube would be cut in a plane at 45 degrees to the longitudinal tube axis. One portion of the severed tube is held stationary, while the other is rotated about its longitudinal axis 180 degrees and axially displaced 90 degrees so that the angularly severed ends abut one another in matching relationship. The two ends can then be joined to provide an abrupt 90 degree change in direction.

The difficulty with this prior art method resides in the fact that it is difficult to retain the ends in position for joining, since the ends must be accurately abutted and matched. Further, the only contacting surfaces which can be joined are the peripheral surfaces of radial dimensions equal to the wall thickness of the tubing. It is difficult to obtain good mechanical strength by the mere joinder of these two extremely limited surfaces.

The method of the present invention is utilized for making a tubing joint whereby a relatively sharp change in direction can be effected in a tubing fabrication assembly, the joint having improved mechanical strength and being readily retained in position for joining because of a partial nesting of the parts.

More specifically, the method of the present invention contemplates the formation of a relatively shallow, elliptical cup or pocket in one of the severed ends and within which the other severed end is positioned in telescopically received relation, so that the parts may be readily indexed into proper alignment and retained in such alignment prior to the joining of the parts together. Further, to secure the parts together it is only necessary to effect a joinder of the telescopically nested portions of the tubing pieces. Thus, an increased joining area is provided and improved mechanical strength results.

Thus, a tubing joint of the present invention includes a pair of pieces of tubing having angularly disposed elliptical end surfaces, one of the end surfaces being formed into an elliptical cup defined by peripheral flanges extending from the one piece in the direction of direction change and a second piece of tubing having an elliptical end section inserted into and secured within the elliptical cup.

It is, therefore, an important object of the present invention to provide a new and improved tubing joint and method for making the same.

Another important object of the present invention is to provide an improved method for making a tubing joint to effect a relatively sharp change in direction by the formation of an elliptical cup at the extremity of a length of tubing, and the insertion of the elliptical end of a second piece of tubing in the cup, followed by the securing together of the tubing ends.

It is a further object of this invention to provide an improved tubing joint in which a piece of tubing is severed along a shear line lying at an acute angle to the longitudinal axis, the sheared ends of the tube being elliptical in contour and complementary to one another, one of the tubing lengths thus provided having a radially enlarged elliptical cup formed integrally therewith and projecting from the remainder of the tube in the direction of direction change, and the other tubing section having its elliptical end inserted in and bottomed within the elliptical cup to be secured therein.

Yet another important object is the provision of an improved method for making an abrupt change in direction at a pipe joint by juxtaposing the angularly severed, complementary ends of a pair of lengths of tubing, inserting the end of one of said tubing lengths into an angularly directed cup formed at the extremity of the other tubing length, and securing together the tubing lengths at their point of telescopic engagement.

It is a still further object of this invention to provide an improved pipe or tubing joint defining the juncture between a pair of separate tubing lengths, one of the tubing lengths having an angularly deflected pocket formed therein and defined by an elliptical flange projecting from the one piece of tubing in the direction of direction change, and the other piece of tubing having its end surface lying on an acute angle to the axis thereof and projecting into the pocket in nested relation with the annular flange, and the telescoped sections of said tubing pieces being peripherally secured together.

These and other objects will become more apparent from the following detailed description of a preferred embodiment of my invention and by reference to the drawings forming a part hereof wherein:

On the drawings:

Figure 1 is an elevational view, with parts broken away and in section, illustrating a step in the method of the present invention wherein male and female flanging dies are utilized to form a portion of the cup in one piece of the tubing forming the joint of the present invention;

Figure 2 is a sectional view, with parts shown in elevation, taken along the plane 2—2 of Figure 1;

Figure 3 is an enlarged sectional view, with parts shown in elevation, taken along the plane 3—3 of Figure 1;

Figure 4 is a view similar to Figure 1 illustrating a second step in the method of the present invention utilizing male and female punch dies for further forming the cup;

Figure 5 is an enlarged sectional view taken along the plane 5—5 of Figure 4;

Figure 6 is an elevational view of a tubing joint of the present invention;

Figure 7 is a plan view of the joint of Figure 6;

Figure 8 is a sectional view taken along the plane 8—8 of Figure 6; and

Figure 9 is a sectional view taken along the plane 9—9 of Figure 6.

As shown on the drawings:

In Figure 1, reference numeral 10 refers generally to a female flanging die comprising a central stationary die block 11 secured by suitable means (not shown) to the bed 12 of a press.

The stationary female die block 11 is provided at its left hand face 13 (Figure 3) with a vertically extending, generally semi-cylindrical recess 14 adapted to receive a length of tubing, as will be hereinafter more fully described. The upper surface 15 of the die block 11 is provided with a recess 16, the bottom 17 of which is of semi-cylindrical form for a purpose to be hereinafter more fully described. Surmounting the stationary die block 11 are a pair of laterally spaced guide elements 18 between which depends a vertically reciprocable die actuation block 19 which depends from a male die block, indicated generally at 20, and adapted to be secured to the ram of a press.

The lower surface 21 of the block 19 is chamfered or inclined for a purpose to be later described. The stationary female die block 11 is also provided with a pair of transverse apertures adapted to slidably receive guide rods 23, one of these apertures being illustrated in Figure 1 and identified as aperture 24. The stationary female die block 11 also carries a pair of transversely extending spring guide rods 25 which are threadedly received, as at 26, by the block 11.

Slidably disposed on the guide rods 23 are a pair of cam blocks 27 having a chamfered upper cam surface 28 which is adapted to be abutted by the chamfered surface 21 of the actuation blocks 19 to move the cam blocks 27 to the right (as illustrated in Figure 1) upon descending movement of the press ram and the male die block 20. To insure co-movement of the guide rods 23 and the cam blocks 27, these two elements are interconnected through a guide plate 29 which is contacted by a nut 30 threadedly retained on the guide rod 23 to urge the guide plate 29 against an annular shoulder 31 formed on the guide rod 23. The guide plate 29 is also apertured as at 32 to receive therethrough the spring rods 25 with a compression spring 33 being confined between the guide plate 29 and a washer 34 retained on the spring rod 25 by a nut 35.

The guide rods 23 project through the apertures 24 and the die block 11 and threadedly receive upon their upper free end nuts 36 which abut a movable female die block, indicated generally at 37. The movable female die block 37 is illustrated in Figure 2 of the drawings in which it will be seen that the inner face 38 of this die block is provided with a semi-cylindrical recess 39 complementary to the recess 14 formed in the die block 11, and also with an upper, somewhat fragmentary, recess 40 which is complementary to the recess 16 in the block 11. The press ram also carries a male flanging die, indicated generally at 42, and comprising essentially a generally cylindrical male die element 43 provided with a radially projecting, generally cylindrical flanging stud 44 vertically aligned with the recesses 16 and 40 which are cooperably defined by the fixed die block 11 and the movable die block 37. The male flanging die 42 is carried by a die block structure, indicated generally at 45, and effective to secure the die 43 to the ram for reciprocation therewith.

As illustrated in Figures 1, 2 and 3 of the drawings, the semi-cylindrical recesses 39 of the die blocks 11 and 37 cooperate to confine therebetween a piece of tubing indicated generally at 50. The tubing 50 is of circular cross section and is provided with a bend indicated generally at 51, of relatively large radius, and with a terminal end 52 severed along a plane lying at an acute angle to the axis of the tube end, so that the end of the tube 51 actually defines an elliptical opening.

When the male die 42 is retracted or elevated from its position illustrated in Figure 1, the spring 33 will react against the guide plate 29 to force the guide plate 29 to the left. This leftward movement of the guide plate 29 will, because of the shoulder 31 on the guide rod 23, effect leftward movement of the guide rod to move the movable female die block 37 to the left, separating the die blocks 11 and 37. The piece of tubing 50 can now be inserted into the die recesses 14 and 39. The bend in the tube 50, by mating with the complementary bends in the die block recesses, will position the tube vertically with the open upper end of the tube projecting into the open-topped recesses 40 and 16. Upon actuation of the ram, the ram will descend with the chamfered lowered edge 21 of the actuating plates 19 contacting the cam surfaces 28 of the cam blocks 27, thus moving the guide rods 23 to the right and pulling the movable die block 37 into snug abutment with the stationary die block 11.

At the same time, the male flanging die 42 will be descending with the lower chamfered end 46 of the cylindrical die portion 43 entering the open end of the tube 50. The die portion 43 is larger in exterior diameter than the interior diameter of the tube 50 so the forcible entry of the die thereinto will expand the tube radially into full peripheral contact with the cylindrical recesses 14 and 39 formed in the die blocks 11 and 37, respectively.

Also during the downward press stroke, the cylindrical projection 44 on the male die 42 enters the recesses 16 and 40. The projection 44 is vertically aligned with the major diameter of the elliptical opening 52, and the lower surface of the projection 44 will engage the lower edge of that portion of the tube forming the elliptical opening 52, so that this portion of the tube will be deformed radially outwardly of the tube to provide an out-turned flange 53. Actually, this flange is formed between the bottom of the recesses 16 and 40 in the die blocks 11 and 37, respectively, and the flange so formed is less than 180 degrees in extent, the flange projecting radially outwardly with respect to the remainder of the tube.

Next, the press ram is elevated and the tube 50 bearing the flange 53 is removed from the female die.

In Figure 4, there is illustrated a forming and piercing die comprising a lower male die section 60 and an upper movable female die section, indicated generally at 61. The lower die section 60 comprises a base plate 62 adapted to be connected to the bed plate of a press or the like and surmounted by a grooved position block 63 which is adapted to support the tube 50 in its position illustrated in Figures 4 and 5. Additionally, the base plate 62 supports a centrally located, upstanding projection 64 having a centrally located upstanding male die 65 of generally cylindrical cross section with its upper edges laterally inwardly and upwardly sloping, as at 66 (Figure 5), to conform to the desired inner contour of the end of the tube 50, as will be hereinafter more fully described. The male die 65 is recessed, as at 67, to receive a piercing die 68 having central bore 69.

Laterally offset from the male die 65, the base plate 62 carries a guide block 70 having a wear insert 71 for guiding contact with a flanging die 72 secured to and carried by the press ram. The flanging die 72 peripherally contacts the wear plate 71, and the inner periphery 73 of the flanging die is spaced from the exterior periphery of the male die 65 through a distance substantially equal to the wall thickness of the tube 50. Consequently, upon lowering movement of the ram the flange die 72 will turn down that portion of the tube periphery encompassed by the die.

It will be noted from Figure 4 that the flanging die 72 turns down the flange 54 which is of a peripheral extent of less than 180 degrees because of the angular configuration of the open tube end with respect to the tube axis. Additionally, it will be noted that the flanges 54 and 53 are substantially parallel and project from the body of the tube 50 in the same direction. Before the flange 54 is being formed, a forming die 75 closes upon the tube 50. The forming die 75 is provided with a central recess 76 having a flat inner and upper surface 77 which forms a corresponding flat in the tube side wall adjacent the flange 54. After the forming die 75 has completely closed, a free floating punch 78 bottoms against a ram insert 79 to form an aperture 80 in the flattened portion of the tube, the aperture 80 being utilized in attaching the tube in a manner not shown.

After the flange 54 has been formed, the flat 55 has been formed in the tube and the aperture 80 has been punched, the press ram is raised to separate the die and the finished tube 50 is removed therefrom by suitable stripping means (not shown).

In Figures 6–9, inclusive the finished tube joint is illustrated. The tube fabrication illustrated in these drawings may be utilized as the vent tube for an internal combustion engine crank case or the like. Generally, the assembly comprises the tube 50 formed as heretofore described, and the angularly disposed open end 52 which is partially circumscribed by the flange 53 and partially circumscribed by the flange 54. The end 52 of the tube 50 has been radially enlarged, as by the insertion of the male die 43, heretofore described, the actual radial enlargement of the tube amounting to approximately the tube thickness. The flanges 53 and 54 are joined by the terminal wall portions which were angularly cut during the formation of the original tube 50, but which have been merely expanded, as heretofore described. The flanges 53, 54 and the intermediate expanded tube portion cooperatively define an elliptical cup of a diameter greater than the original tube diameter and having a major axis extending between the major ends of the elliptical configuration defined by the flanges 53 and 54, and a minor axis equivalent to the expanded diameter of the tubing.

As best illustrated in Figure 9, the top of the tube 50 is flat, as at 55, to accommodate the aperture 80 which may be readily utilized for the insertion of a bolt, screw or the like, for securing the tube assembly to the crank case or other component with which it is utilized.

The cup, defined by the flanges 53, 54 and the opening 52, is adapted to receive therein a second length of tubing 56. Preferably, the piece of tubing 56 is the second piece which was formed by the initial shearing of the tube 50, so that the open end 57 of the tube 56 lies at the same angle with relationship to the axis of the tube 56 as does the opening 52 with respect to the axis of its tube 50. In other words, the openings in the two tubes are complementary. For example, if a right angle turn were to be made, as illustrated in Figures 6 through 9 inclusive, both of the tube end faces lie at an angle of 45 degrees to the respective tube axes. Thus, the open end of the tube 56 is elliptical in contour. Due to the radial expansion of the end 52 of the tube 50, the end 57 of the tube 56 fits snugly therein, and the axis of the tube 56 will be oriented angularly with respect to the axis of tube 50, the relative angular area depending upon the angle of shear when the two tubes are initially formed.

It will be noted that the insertion of the tube 56 into the cup of the tube 50 will result in the open end 57 of the tube 56 abutting an internal shoulder formed in the tube 56 at the point of juncture of the flange 54 with the undeformed wall of the tube 50. This shoulder is indicated at 58 and, when the end 57 of the tube 56 is positively bottomed against the shoulder, the major axes of the elliptical tube openings are aligned and the tubes are in complete registry. The provision of the flared, open-mouthed, elliptical cup makes possible the nesting of the open ends of the tubes and, because of the nesting portions of the tubes insuring adequate registry of the tube bores, the tubes may be readily secured by suitable means, as by spot welding, as at 59 (Figure 6). Alternatively, the juncture may be attained by welding, brazing, or otherwise securing the tubes together, and also under some conditions, a mechanical joint can be effected without use of external fastening means or the actual uniting of the materials.

In summary, it will appear that the present invention provides a new and novel method for making an abrupt change in direction in a tubular item. More specifically, this method involves the severing of a tube into two parts along a line of shear lying at an angle to the longitudinal axis of the tube equal to one-half of the desired angular change in direction, the formation of a pocket or cup on one of the severed ends of the tube, the insertion of the other severed end of the tube within this pocket or cup, and, if desired, the securing together of nested portions of the tubes. The formation of the pocket is preferably carried out by clamping the tube so that the exterior diameter thereof is encompassed at the severed end, forcing a cylindrical forming punch of a diameter slightly greater than the tube interior diameter into the end of the tube to radially enlarge the same, the sequential or simultaneous formation of angularly directed flanges projecting from the tube in the direction of direction change, each of the flanges being less than 180 degrees in extent and lying at the major end of the elliptical opening formed at the angularly severed tube end.

The finished tubular article having an abrupt change of direction is smoothly contoured at its inner surface to accommodate the flow of fluid or solid therethrough, a high mechanical strength joint is obtained by the utilization of double tubing wall thickness at the exact point of juncture, and the juncture is effected while the parts are held in exact registry by the nesting cup and tube end configuration.

While preferred embodiments have been described above in detail, it will be understood that numerous modifications might be resorted to without departing from the scope of my invention as defined in the following claim.

What I claim is:

In a method of forming a tubular article having an abrupt change in direction, the steps of severing a tube into two parts at an angle of shear equal to one-half the angle of directional change to provide elliptical terminal ends on the severed tubing pieces, forming a generally elliptical pocket in the end of one of the severed tube pieces by enlarging the end radially and radially deforming the enlarged extremities thereof at the ends of the major axis of the elliptical terminal end of said one piece in the direction of change to provide arcuate flanges at the major ends only of the elliptical opening therein, each of said flanges being less than 180 degrees in extent and the flanges being joined by expanded portions of the tube side walls, inserting the unchanged severed end of the other piece of tubing into said pocket in telescopic relation to said flanges and to said expanded side walls, aligning the major axes of said ends by bottoming said severed end in said pocket, and securing said expanded side walls to the telescoped end of said other tube.

References Cited in the file of this patent

UNITED STATES PATENTS

| 63,422 | Powell | Apr. 2, 1867 |
| 99,459 | Morrison | Feb. 1, 1870 |
| 142,929 | Morrison | Sept. 16, 1873 |
| 287,494 | Barker | Oct. 30, 1883 |
| 534,381 | Swenson | Feb. 19, 1895 |
| 972,119 | McKibben | Oct. 4, 1910 |
| 1,077,741 | Neveu | Nov. 4, 1913 |
| 1,598,893 | Taylor | Sept. 7, 1926 |
| 1,750,010 | King | Mar. 11, 1930 |
| 1,868,696 | Crary | Sept. 4, 1930 |
| 1,908,373 | Loepsinger | May 9, 1933 |
| 1,993,361 | Cornell | Mar. 5, 1935 |
| 2,183,271 | Wendel | Dec. 12, 1939 |
| 2,736,949 | Kraemer | Mar. 6, 1956 |

FOREIGN PATENTS

| 276,537 | Germany | July 14, 1914 |